(12) United States Patent
Hodgson et al.

(10) Patent No.: US 8,549,841 B2
(45) Date of Patent: Oct. 8, 2013

(54) METHOD AND DEVICE FOR THE CONTROLLED FEEDING OF A REDUCING AGENT

(75) Inventors: Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 234 days.

(21) Appl. No.: 13/026,439

(22) Filed: Feb. 14, 2011

(65) Prior Publication Data

US 2012/0036837 A1 Feb. 16, 2012

Related U.S. Application Data

(63) Continuation of application No. PCT/EP2009/060402, filed on Aug. 12, 2009.

(30) Foreign Application Priority Data

Aug. 13, 2008 (DE) .................. 10 2008 038 986

(51) Int. Cl.
*B01D 53/92* (2006.01)
*F01N 5/00* (2006.01)

(52) U.S. Cl.
USPC ............... 60/286; 60/274; 60/278; 60/301; 60/303

(58) Field of Classification Search
USPC .................. 60/286, 274, 278, 301, 303
See application file for complete search history.

(56) References Cited

U.S. PATENT DOCUMENTS

| | | | |
|---|---|---|---|
| 5,628,186 A | 5/1997 | Schmelz | |
| 5,785,937 A | 7/1998 | Neufert et al. | |
| 6,415,602 B1 | 7/2002 | Patchett et al. | |
| 6,698,191 B2 | 3/2004 | Xu et al. | |
| 7,150,145 B2 * | 12/2006 | Patchett et al. | 60/286 |
| 8,141,347 B2 * | 3/2012 | Kubinski et al. | 60/286 |
| 2002/0054844 A1 | 5/2002 | Pfeifer et al. | |
| 2004/0128982 A1 | 7/2004 | Patchett et al. | |

FOREIGN PATENT DOCUMENTS

| | | |
|---|---|---|
| DE | 4315278 A1 | 11/1994 |
| DE | 10226636 A1 | 2/2003 |
| EP | 0775013 A1 | 5/1997 |
| EP | 1203611 A1 | 5/2002 |
| EP | 1339955 B1 | 8/2005 |
| GB | 2435625 A | 9/2007 |

OTHER PUBLICATIONS

International Search Report dated Dec. 16, 2009.

* cited by examiner

*Primary Examiner* — Kenneth Bomberg
*Assistant Examiner* — Brandon Lee
(74) *Attorney, Agent, or Firm* — Laurence A. Greenberg; Werner H. Stemer; Ralph E. Locher

(57) ABSTRACT

A method and a device provide for the controlled feeding of a reducing agent into an exhaust gas treatment unit with a storage capability for an exhaust gas component to be reduced which is generated from a mobile internal combustion engine. The method includes at least the following steps: a) determination of a quantity of the exhaust gas component to be reduced which is generated by the mobile internal combustion engine, b) determination of a storage capability of the exhaust gas treatment unit for the exhaust gas component to be reduced, c) determination of a metering of the reducing agent into the exhaust gas treatment unit as a function of steps a) and b), and d) feeding the reducing agent into the exhaust gas treatment unit.

7 Claims, 2 Drawing Sheets

US 8,549,841 B2

METHOD AND DEVICE FOR THE CONTROLLED FEEDING OF A REDUCING AGENT

CROSS-REFERENCE TO RELATED APPLICATION

This is a continuation, under 35 U.S.C. §120, of copending International Application No. PCT/EP2009/060402, filed Aug. 12, 2009, which designated the United States; this application also claims the priority, under 35 U.S.C. §119, of German Patent Application DE 10 2008 038 986.2, filed Aug. 13, 2008; the prior applications are herewith incorporated by reference in their entirety.

BACKGROUND OF THE INVENTION

Field of the Invention

The present invention relates to a method for the controlled feeding of a reducing agent into an exhaust gas treatment unit with a storage capability for an exhaust gas component to be reduced which is generated by a mobile internal combustion engine. Furthermore, a device is also provided to carry out the method described herein.

In the exhaust gas post-treatment of mobile internal combustion engines, such as lean-burn engines or diesel engines, it is known to reduce the nitrogen oxides ($NO_x$) contained in the exhaust gas with the participation of a chemical reducing agent, which is fed-in upstream of a reduction catalytic converter. In this connection, particularly in the case of diesel engines, an SCR catalytic converter is generally provided in the exhaust gas system. The SCR catalytic converter uses the reducing agent to reduce nitrogen oxides to nitrogen ($N_2$) and water ($H_2O$). The reducing agent in that case is fed directly into the exhaust gas, or a chemical precursor of the reducing agent is fed-in which liberates the reducing agent only once it is in the exhaust gas system. The reducing agent being used is, in particular, ammonia ($NH_3$), which is fed into the exhaust gas as a gas or as an aqueous solution. Due to harmful dealings with $NH_3$, urea is normally used as a chemical precursor nowadays and is fed-in either in the form of an aqueous solution or as a solid. The thermohydrolytic breakdown of urea with the liberation of ammonia is carried out by the heat of the exhaust gas stream and/or a hydrolytic catalyst and/or in an evaporator and/or in a chemical reactor. Known SCR catalytic converters are constructed with carrier structures, such as ceramic or metallic structures in the manner of honeycomb bodies, foams, etc. Those carrier bodies additionally have a coating, in particular a so-called washcoat with a mixture of vanadium pentoxide ($V_2O_5$), tungsten oxide ($WO_3$) and titanium dioxide ($TiO_2$). In addition, SCR coatings are also known which, for example, have iron-containing zeolites and/or noble metals such as ruthenium, rhodium, palladium, gold or platinum.

The problem with the use of SCR catalytic converters is that they regularly only begin catalytic conversion to a relevant extent starting from a certain limit temperature. That limit temperature lies around 200° C. In addition, it is necessary to take into account that the SCR catalytic converter itself can also have a certain storage capability for the reducing agent and/or the nitrogen oxides. For example, that storage capability regularly varies with regard to different operating situations of the internal combustion engine. In particular, that makes exact feeding-in of the reducing agent difficult. It is also necessary to take into account that so-called ammonia breakthroughs should be avoided. That is understood to mean, in particular, that metering in is not intended to take place to the extent that non-converted ammonia escapes from the SCR catalytic converter. Until now, in corresponding exhaust gas systems, for reasons of safety, a so-called blocking catalytic converter has been provided, which is disposed downstream of the SCR catalytic converter and is an oxidizing catalytic converter containing noble metal.

SUMMARY OF THE INVENTION

It is accordingly an object of the invention to provide a method and a device for the controlled feeding of a reducing agent, which overcome the hereinafore-mentioned disadvantages and at least partly solve the highlighted problems of the heretofore-known methods and devices of this general type. In particular, the intention is to specify a method and a device for the controlled feeding of a reducing agent into an exhaust gas treatment unit having a storage capability for an exhaust gas component to be reduced which is generated in a mobile internal combustion engine. In the method and device, the most complete conversion possible of the components to be reduced should take place and at the same time ammonia breakthroughs should be avoided. In particular, the intention is also to specify a control strategy for feeding liquid urea-water solution into an SCR catalytic converter which is constructed with a nitrogen oxide storage capability.

With the foregoing and other objects in view there is provided, in accordance with the invention, a method for the controlled feeding of a reducing agent into an exhaust gas treatment unit having a storage capability for an exhaust gas component to be reduced being generated by a mobile internal combustion engine. The method comprises at least the following steps:

a) determining a quantity of the exhaust gas component to be reduced being generated by the mobile internal combustion engine;
b) determining a storage capability of the exhaust gas treatment unit for the exhaust gas component to be reduced;
c) determining a metering of the reducing agent into the exhaust gas treatment unit as a function of steps a) and b); and
d) feeding the reducing agent into the exhaust gas treatment unit.

The method is implemented in principle during the operation of a mobile internal combustion engine, that is to say when exhaust gases are being produced by the internal combustion engine, in particular a diesel engine. The control of the feeding of the reducing agent has the aim of converting the component to be reduced in the exhaust gas with a high conversion rate. To this extent, the metering of the reducing agent firstly has to be matched to the proportion of the component of the exhaust gas which is to be reduced. For this purpose, in step a), firstly the quantity of the component in the exhaust gas which is to be reduced is to be registered. In principle, it is possible for the quantity of the component to be reduced to be determined in proportions by volume, mass and/or weight. It is also possible that in this case, besides registration by sensors, for correction of the measured value being registered to also be considered. It is also possible for the quantity to be determined in advance or anticipated in view of the load of the internal combustion engine that is current or to be expected at a later time. In the meantime it is likewise possible in this case to take into account the fact that the composition of the waste gas in the flow direction from the internal combustion engine ultimately as far as the exhaust gas treatment unit being considered can vary.

Prior to, at the same time as or after step a), the determination of the current storage capability of the exhaust gas treatment unit for the component which is to be reduced can then be carried out (step b)). The storage capability of the exhaust gas treatment unit can, in particular, include an adsorption behavior of the component of the exhaust gas which is to be reduced. This applies to a coating and/or a carrier body of the exhaust gas treatment unit. It should be pointed out, only for completeness, that in this case, under certain circumstances the storage capability of the exhaust gas treatment unit for the reducing agent can also be considered if the exhaust gas treatment unit likewise has a storage capability for the reducing agent.

The actual metering of the reducing agent into the exhaust gas treatment unit is then defined as a function of the two aforementioned steps, from the knowledge of the storage capability according to step b). The metering can relate in practical terms to one or more volume units of the reducing agent, opening times of the metering device or the like. The metering of the reducing agent is carried out in such a way that the components of the exhaust gas which are currently capable of reacting and are to be reduced can make contact with the reducing agent, that is to say, in particular, no reducing agent for the components which are to be reduced that are currently stored in the exhaust gas treatment unit is sprayed in, or in such a way as to carry out an increase in the feeding in order to convert the components of the exhaust gas which are to be reduced and are desorbing from the exhaust gas treatment unit.

The feeding-in of the reducing agent itself according to step d) will regularly take place upstream, that is to say before, the exhaust gas treatment unit. In this case, it is further preferred for the reducing agent to be fed-in in liquid or gaseous form. The reducing agent then evaporates at the latest in the exhaust gas stream itself. The distance to the exhaust gas treatment unit should also be chosen in such a way that a uniform distribution of the reducing agent in the exhaust gas stream and therefore subsequently also in the exhaust gas treatment unit, is ensured.

In accordance with another mode of the method of the invention, the quantity of the component of the exhaust gas which is to be reduced that is generated by the mobile internal combustion engine, is calculated in step a). To this end, in particular models can be stored which predefine the proportion of the component of the exhaust gas which is to be reduced as a function of the load of the internal combustion engine, the temperature, the lambda ratio, etc. To this extent, recourse can also be had to empirical values in step a). These models are regularly provided in a data-processing system and can be processed herewith.

In accordance with a further mode of the invention, it is viewed as advantageous that step b) is carried out at least as a function of the temperature of the exhaust gas or the temperature of the exhaust gas treatment unit. If appropriate, provision can also be made for the temperatures both of the exhaust gas and of the exhaust gas treatment unit to be taken into account for the determination of the storage capability of the exhaust gas treatment unit. Often, the storage capability of the exhaust gas treatment unit is temperature-dependent, with a greater storage capability being determined at lower temperatures than at higher temperatures. To this extent, it is proposed herein also to fall back on a practical registration of the temperature, for example in addition to computational models.

In accordance with an added mode of the invention, it is also viewed as advantageous that step b) is carried out as a function of the time after a start of the internal combustion engine. Precisely for the case when a significant storage capability of the exhaust gas treatment unit is provided only in the range of cooler temperatures, for example up to 150° C., and/or in this temperature range only a significant change in the storage capability is to be determined, step b) can possibly also be simplified by empirical values being taken into account with regard to the time after the start of the internal combustion engine until the exhaust gas treatment unit has reached its desorption temperature.

In accordance with an additional mode of the invention, a method is preferred in which step b) is carried out as a function of at least one of the preceding steps d). This means, in other words, in particular that information from the previous operation of the internal combustion engine (e.g. the driving behavior or the environment) and/or the conversion rates achieved can be used in the determination of the metering of the reducing agent.

In accordance with yet another mode of the invention, a method which is quite particularly preferred is when urea is fed-in as the reducing agent to an exhaust gas treatment unit of an SCR-type catalytic converter with a nitrogen oxide storage capability, and the component of the exhaust gas which is to be reduced is nitrogen oxides. In particular in this case, therefore, an operating method for the exhaust gas system of a mobile internal combustion engine, such as a diesel engine, is proposed in which liquid urea-water solution is put in.

In accordance with yet a further mode of the invention, in this connection, it is possibly also viewed as advantageous if, in the method, the determination of the metering of the reducing agent into the exhaust gas treatment unit is carried out as a function of a storage capability for nitrogen oxides of the SCR catalytic converter. In this case, an appropriate exhaust gas treatment unit can additionally be provided in the flow path of the exhaust gas between the metering unit and the SCR catalytic converter, so that in this case, in particular, the storage capability of a plurality of exhaust gas treatment units is taken into account.

In accordance with yet an added mode of the invention, it is also viewed as advantageous that the storage capability of the exhaust gas treatment unit is controlled actively. This means, in other words, in particular that action is taken specifically on the storage capability of the exhaust gas treatment unit through the use of external measures, automatically and/or in response to an actual stimulus. In this case, in particular the temperature in the region of the exhaust gas treatment unit is controlled actively, so that additional measures for the production of thermal energy are therefore preferred in this case. In this connection, it is, in particular, proposed that, for the case in which a temperature difference exists between the start of the desorption behavior of the exhaust gas treatment unit and the catalytic conversion of the components to be reduced, this difference can be bridged particularly quickly. To this extent, it is in particular possible to determine in this case that when the desorption temperature of the exhaust gas treatment unit having a storage capability has been reached, the exhaust gas treatment unit can be heated additionally, directly and/or indirectly, until finally the temperature for the catalytically active conversion is reached and thus the heating operation is switched off. This additional heating can be used at the start of the internal combustion engine and/or in subsequent operating phases if the temperature of the exhaust gas treatment unit lies in this temperature difference.

With the objects of the invention in view, there is also provided a device, comprising at least one internal combustion engine, an exhaust gas system for conducting a flow of exhaust gas from the internal combustion engine in a flow direction, at least one exhaust gas treatment unit disposed in the exhaust gas system and having a storage capability for an exhaust gas component to be reduced, a metering unit disposed in the exhaust gas system for feeding or discharging a reducing agent to the exhaust gas treatment unit, and a control unit configured to carry out the method according to the invention together with the metering unit.

To this extent, with regard to the functions and operating modes of the components listed individually herein, reference can be made to the previous explanations. It is only for completeness that it should be mentioned herein that the exhaust gas system can of course include further exhaust gas treatment units. The internal combustion engine is, in particular, a lean-burn engine or a diesel engine. Starting from the internal combustion engine, the exhaust gas flows through the at least one exhaust gas treatment unit into the environment, with this flow predefining the flow direction. The metering unit includes, in particular, a reservoir for the (in particular liquid) reducing agent, a feed line leading to a valve or a nozzle of the exhaust gas system and, if appropriate, pumps, sensors, valves, return lines, chemical reactors, heaters, etc. located therebetween. The control unit is, in particular, set up in the manner of a data acquisition and/or data-processing system. The control unit can also be part of a larger system, such as the electronic control unit.

In accordance with another feature of the device of the invention, it is preferred for the at least one exhaust gas treatment unit to be an SCR catalytic converter with a nitrogen oxide storage capability, and for the metering unit to be connected to a urea-water solution supply. In this case, the method can be used, in particular, for the selective catalytic reduction of nitrogen oxides in the exhaust gas from diesel engines. In this case, the reducing agent used is a liquid urea-water solution, which is fed into the exhaust gas in liquid form or in (partially) vaporous form. Even if it is in principle possible to hydrolyze the urea before introduction into the exhaust gas system, it is proposed herein not to effect this until it is in the exhaust gas stream, possibly also with the employment of an appropriate catalyst. In many cases, however, it will be sufficient if the urea-water solution is fed into the exhaust gas in finely distributed form, so that thermolysis takes place there with the elimination of ammonia.

In accordance with another feature of the invention, in this connection, it is also preferred for the SCR catalytic converter to be constructed with an electric heater. In principle, it is possible for the SCR catalytic converter to be formed with a ceramic and/or a metallic carrier body. In this case, heating elements can likewise be incorporated which, as a result of non-reactive resistance heating, can have current applied to them in an actively controllable manner, so that heat can be produced at fixedly predefined times.

In accordance with a concomitant feature of the invention, it is also viewed as advantageous that the exhaust gas treatment unit has at least one sensor for the direct determination of the temperature of a catalytically active coating. To this end, in particular a sensor is provided which is disposed between the carrier body and the coating applied thereto. Therefore, particularly accurate knowledge relating to the temperature of the catalytically active coating and therefore also of the storage capability of the latter, can be obtained.

Other features which are considered as characteristic for the invention are set forth in the appended claims, noting that the features listed individually in the claims can be combined with one another in any desired technologically expedient way and indicate further refinements of the invention.

Although the invention is illustrated and described herein as embodied in a method and a device for the controlled feeding of a reducing agent, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
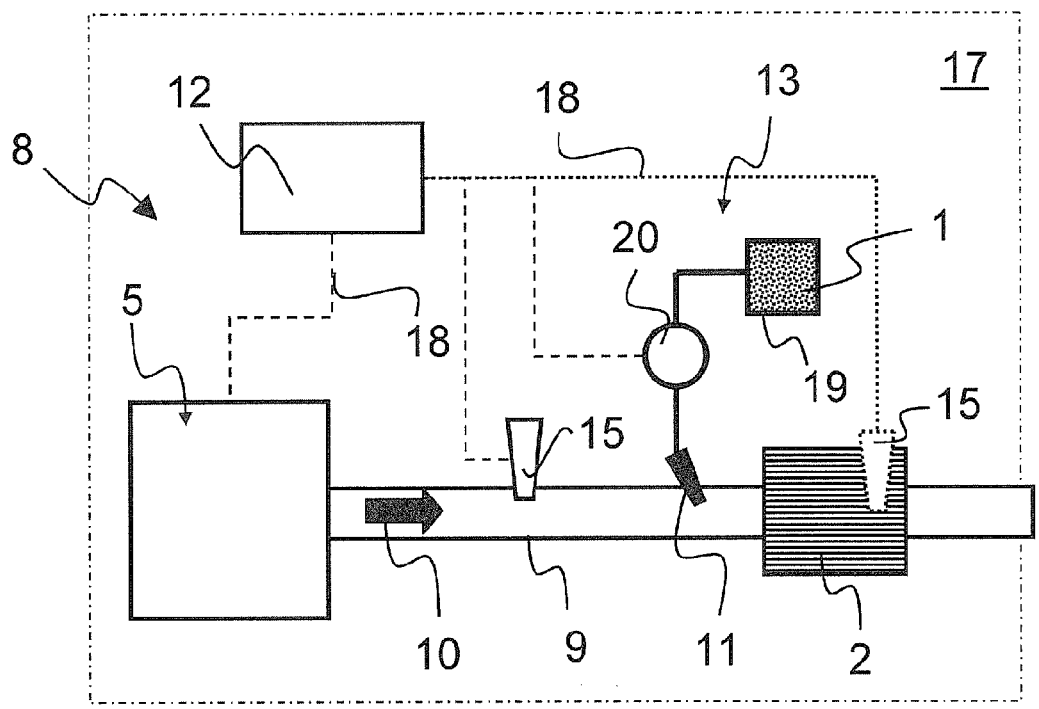
FIG. 1 is a diagrammatic, plan view showing a structure of a motor vehicle having a device according to the invention.

Referring now in detail to the figures of the drawing for explaining the invention and the technical field in more detail by showing particularly preferred structural variants to which the invention is not restricted, and first, particularly, to FIG. 1 thereof, there is seen a device 8 having an internal combustion engine 5 of the diesel engine type, which is adjoined by an exhaust gas system 9. Exhaust gas produced in the internal combustion engine 5 flows through the exhaust gas system 9 in a flow direction 10. In the process, it impinges on an exhaust gas treatment unit 2 of an SCR catalytic converter type with a nitrogen oxide storage capability.

A metering unit 11 is provided between the internal combustion engine 5 and the exhaust gas treatment unit 2, for feeding in a reducing agent 1 (urea-water solution). No further components of the exhaust gas system 9 are provided between the metering unit 11 and the exhaust gas treatment unit 2 in this case, but this does not have to be so. In this case, the metering unit 11 acts together with a urea-water solution supply 13. This urea-water solution supply 13 includes a tank 19 for storing the reducing agent 1. The reducing agent 1 is conveyed at the correct time by a pump 20, which is possibly operated and controlled by a control unit 12, toward the metering unit 11 which, for example, is of a nozzle and/or valve type.

The device 8 is implemented in this case in a motor vehicle 17. With regard to the operation of the motor vehicle 17 and the device 8, it is possible to determine that, by monitoring the exhaust gas system 9 by sensors 15 and/or monitoring the exhaust gas treatment unit 2 by sensors 15 and/or monitoring the processes in the internal combustion engine 5, it is possible to obtain information, in particular in order to determine the quantity of the nitrogen oxide in the exhaust gas generated by the mobile internal combustion engine 5 and/or the storage capability of the exhaust gas treatment unit for nitrogen oxides. The corresponding data, measured values and/or information is fed over suitable lines 18 to the common control unit 12. There, the metering of the reducing agent 1 is then defined by using the information obtained. Specific feeding of the reducing agent into the exhaust gas treatment unit 2 is made possible through the use of appropriate driving of the pump 20 and/or the metering unit 11.

Figure 2:
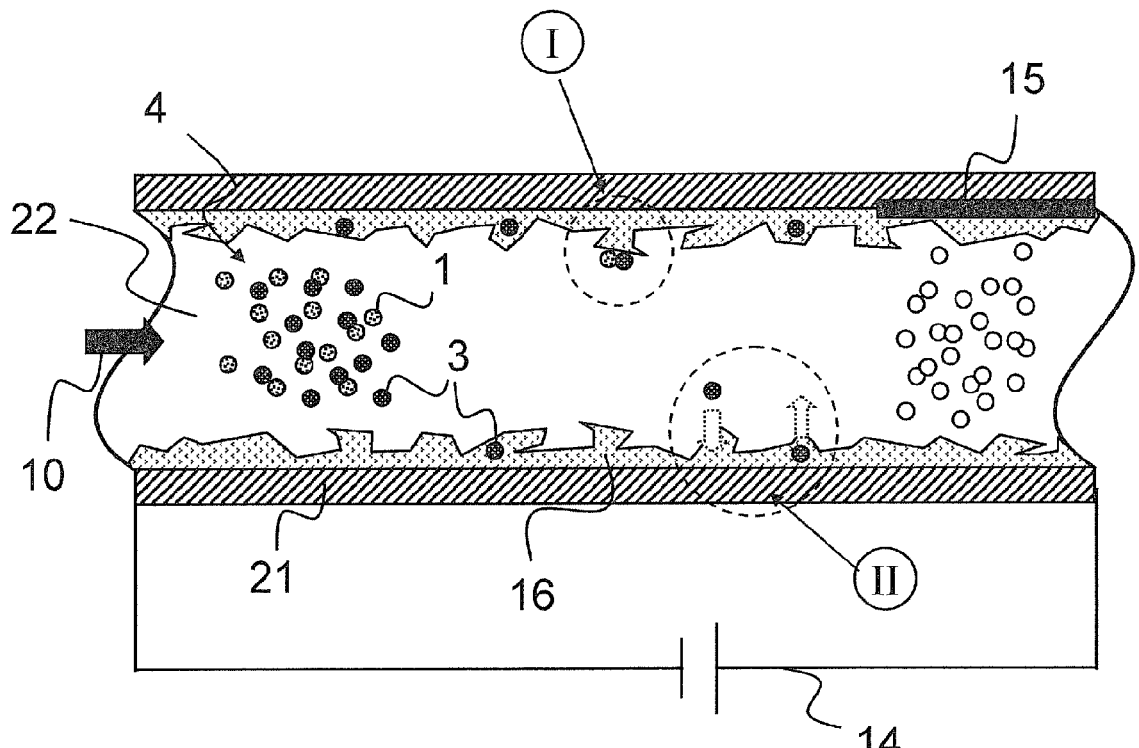
FIG. 2 is an enlarged, fragmentary, longitudinal-sectional view of an exhaust gas treatment unit used to explain processes during operation.

FIG. 2 is used in order to illustrate the processes in the interior of the exhaust gas treatment unit 2. Illustrated therein is an individual channel 22 of the exhaust gas treatment unit 2. The channel 22 is delimited by a wall of a carrier body 21.

In addition, a catalytically active coating 16 is provided on the surface of this carrier body 21. In this case this is, in particular, an SCR coating. Exhaust gas 4 flowing into the channel 22 in the flow direction 10 at this point contains a mixture of the reducing agent 1 and a component 3 of the exhaust gas 4 which is to be reduced. The component 3 which is to be reduced is nitrogen oxides, for example.

As is shown in a portion of FIG. 2 which is designated by reference symbol "I," the reducing agent 1 and the component 3 which is to be reduced now react with each other in the presence of the coating 16, so that the nitrogen oxides are converted into elementary nitrogen and water. However, in the case described herein in which the exhaust gas treatment unit has a storage capability for these components 3 to be reduced, at least some of the components 3 of the exhaust gas which are to be reduced are adsorbed and already adsorbed parts desorb again. This is illustrated by a portion of FIG. 2 which is designated by reference symbol "II."

If, at the current time, it is primarily the component 3 which is to be reduced that is stored by the exhaust gas treatment unit, there is the danger that too much reducing agent is carried along in the exhaust gas, so that the latter could leave the exhaust gas treatment unit again without any conversion. In the converse case, that is to say when the component which is to be reduced and has heretofore been stored desorbs again, too little reducing agent 1 could be available for the reaction, which means that the nitrogen oxides could leave the exhaust gas treatment unit. It is precisely in this case that the invention creates a solution, since it takes into account the adsorption and/or desorption behavior of the components to be reduced with regard to the storage capability of the exhaust gas treatment unit.

In order to obtain detailed information about the current storage capability of the exhaust gas treatment unit 2, a sensor 15 can be provided, for example between the coating 16 and the carrier body 21. Furthermore, the desorption behavior of the coating 16 and/or the catalytic activity thereof can be controlled actively by providing an electric heater 14 with which the carrier structure 21 can be heated.

Figure 3:
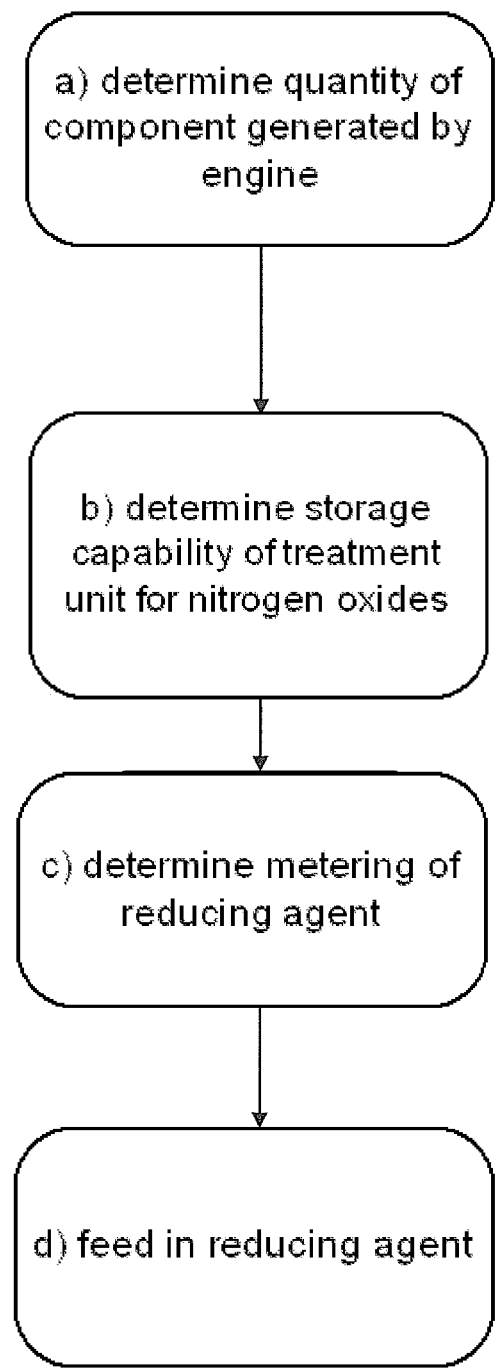
FIG. 3 includes a flow chart and diagrams used to illustrate the method.
Figure 3:
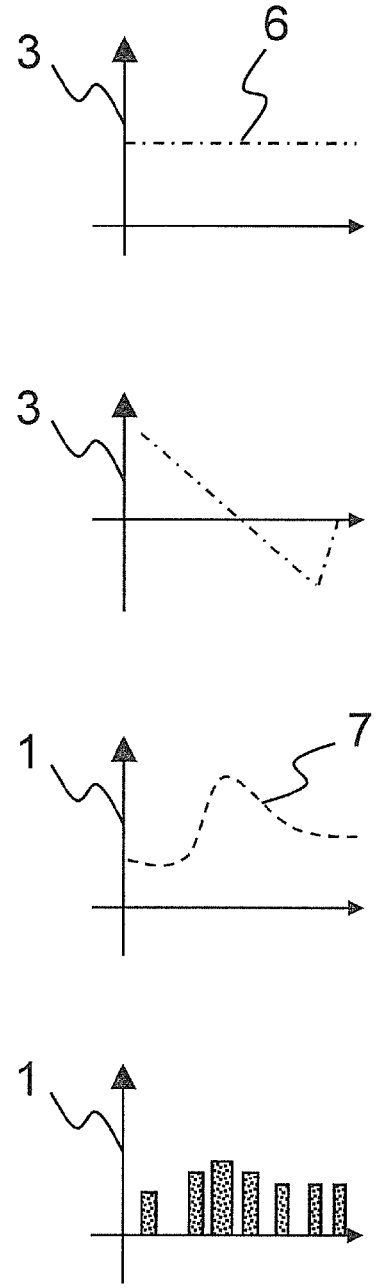

FIG. 3 illustrates the individual steps of the method. In this case, the method described herein is used, in particular, for the controlled feeding of a urea-water solution into an exhaust gas treatment unit of an SCR catalytic converter of the type having a storage capability for nitrogen oxides. Firstly, according to step a), a quantity 6 of the nitrogen oxide component 3 generated by the mobile internal combustion engine (e.g. diesel engine) 5 is determined. In this case, it is illustrated that this demand is now substantially constant for a certain time period. It is clear that this does not reflect any realistic driving situation but this is intended to be sufficient at this point for reasons of simplicity.

Once this quantity 6 has been determined, the storage capability of the exhaust gas treatment unit for the nitrogen oxides can be determined (step b)), subsequently or even in parallel therewith. It can be gathered from the diagram at the right that the storage capability for the component 3 to be reduced (nitrogen oxides) decreases over time, for example following a start of the internal combustion engine. Absorption of the component 3 which is to be reduced is initially possible and the nitrogen oxides are then discharged again later until the result is substantially equilibrium with regard to adsorbing and desorbing components 3 to be reduced. In any case, the storage capability for the current time is determined in this case.

According to step c), a metering 7 of the reducing agent 1, that is to say the urea-water solution, is then determined. It can be gathered from the corresponding diagram that at the start, when more intensive adsorption can therefore be determined, the metering 7 is kept relatively low, since some of the components which are to be reduced are stored in such a way that they cannot be reached by the reducing agent 1. Then, when the desorption begins, higher metering 7 of the reducing agent 1 has to be performed, since in addition to the quantity 6 of the component of the exhaust gas which is to be reduced that is generated by the mobile internal combustion engine, the desorbed portion then has to be converted with reducing agent 1. At the time of equilibrium between adsorption and desorption, a constant quantity 6 can be assumed in step a) and substantially constant metering 7 can also be estimated.

A feeding in of the reducing agent 1 in accordance with step d) can be carried out, in particular, by using different portions, in which a portioned quantity, a frequency of feeding in and the like have to be adapted to the structural configuration of the metering device. In addition, the phase of the reducing agent 1 can also exert an influence on the type or extent of the portions.

The invention claimed is:

1. A method for the controlled feeding of urea into an SCR catalytic converter having a storage capability for nitrogen oxide to be reduced being generated by a mobile internal combustion engine, the method comprising the following steps:
   a) determining a quantity of the nitrogen oxide being generated by the mobile internal combustion engine;
   b) determining a nitrogen oxide storage capability of the SCR catalytic converter;
   c) determining an amount of urea to be introduced into the SCR catalytic as a function of steps a) and b);
   d) feeding the determined amount of urea into the SCR catalytic converter; and
   actively controlling the nitrogen oxide storage capability of the SCR catalytic converter by using an electric heater.

2. The method according to claim 1, which further comprises calculating in step a) the quantity of the nitrogen oxide to be reduced being generated by the mobile internal combustion engine.

3. The method according to claim 1, which further comprises carrying out step b) at least as a function of a temperature of the exhaust gas or a temperature of the SCR catalytic converter.

4. The method according to claim 1, which further comprises carrying out step b) as a function of a time after a start of the internal combustion engine.

5. The method according to claim 1, which further comprises carrying out step b) as a function of at least one preceding step d).

6. A device, comprising:
   at least one internal combustion engine;
   an exhaust gas system for conducting a flow of exhaust gas from said internal combustion engine in a flow direction;
   at least one SCR catalytic converter disposed in said exhaust gas system, said at least one SCR catalytic converter having an electric heater and a storage capability for nitrogen oxides;
   a metering unit disposed in said exhaust gas system for feeding urea to said at least one SCR catalytic converter;
   a urea-water solution supply connected to said metering unit; and
   an electronic control unit configured to carry out the method according to claim 1 together with said metering unit.

7. The device according to claim 6, wherein said at least one SCR catalytic converter has a catalytically active coating and at least one sensor for direct determination of a temperature of said catalytically active coating.

* * * * *